United States Patent
Niebling et al.

(10) Patent No.: US 6,802,399 B2
(45) Date of Patent: Oct. 12, 2004

(54) WHEEL BEARING FLANGE AND FLAT BRAKE DISK FOR MOTOR VEHICLES

(75) Inventors: Peter Niebling, Bad Kissingen (DE); Kay Schumacher, Gochsheim (DE); Heinrich Hofmann, Schweinfurt (DE)

(73) Assignee: FAG Kugelfischer AG (DE)

( * ) Notice: Subject to any disclaimer, the term of this patent is extended or adjusted under 35 U.S.C. 154(b) by 0 days.

(21) Appl. No.: 10/319,719

(22) Filed: Dec. 13, 2002

(65) Prior Publication Data

US 2003/0121733 A1 Jul. 3, 2003

(30) Foreign Application Priority Data

Dec. 15, 2001 (DE) .......................................... 101 61 719

(51) Int. Cl.[7] .............................. B60T 1/06; F16D 65/12
(52) U.S. Cl. ................................ 188/18 A; 188/218 XL
(58) Field of Search ...................... 188/18 A, 218 XL, 188/73.2, 73.35, 73.36, 73.37, 73.38, 205, 206, 71.5, 218 A; 301/6.8, 6.1, 105.1, 6.3; 192/70.2, 70.17; 384/544; 403/372, 336

(56) References Cited

U.S. PATENT DOCUMENTS 6,139,215 A    10/2000    Kuhne et al. ............... 403/337
6,450,303 B1    9/2002    Keck et al. .................. 188/218
6,467,588 B1   10/2002    Baumgartner et al. ...... 188/218
6,520,296 B1 *  2/2003    Bunker ...................... 188/18 A
6,564,912 B1    5/2003    Koschinat ................... 188/218
2003/0066715 A1 4/2003    Baumgartner et al. ......... 188/18

FOREIGN PATENT DOCUMENTS

| DE | 19751522 | | 5/1999 |
| GB | 1496341 | | 12/1977 |
| GB | 2340564 | * | 2/2000 |
| WO | WO 00/63575 | | 10/2000 |

OTHER PUBLICATIONS

Translation of submitted DE019751522C1.*

* cited by examiner

Primary Examiner—Douglas C. Butler
(74) Attorney, Agent, or Firm—Ostrolenk, Faber, Gerb & Soffen, LLP

(57) ABSTRACT

A wheel bearing flange with a periphery having axial extensions for the mounting of a flat annular brake disk thereon. An isolating connecting element between the axial extensions and the brake disk. The axial extensions have radially outwardly directed projections which engage in radially inward recesses with the interior of the brake disk. The connecting element elastically pre-loads the brake disk relative to the axial extensions to elastically compensate for displacements of the brake disk while driving.

9 Claims, 6 Drawing Sheets

WHEEL BEARING FLANGE AND FLAT BRAKE DISK FOR MOTOR VEHICLES

FIELD OF THE INVENTION

The invention relates to the connection of a flat brake disk to the wheel flange of a vehicle and particularly relates to an elastic connection.

BACKGROUND OF THE INVENTION

Flat brake disks are being used to an increasing extent in the automotive field. One reason for their use is the desire to reduce the problem of so-called "brake judder". "Brake judder" is a comfort problem which expresses itself in the form of unwanted noise during braking, some vibrations starting in components lying outside the brake.

DE 197 51 522 C1 discloses a flat brake disk, which is connected to the wheel flange by a connecting part. The design of the connecting part prevents radially pre-loading the brake disk. A further problem of the disclosed arrangement lies in the fact that, during cornering, the wheel flange bends elastically as a result of the load due to the moment of tilt, which load is introduced through the rim. The brake disk is mounted directly on the wheel flange and it also tilts accordingly. This causes the brake disk to press against one brake pad and wear under unbraked cornering. This may cause displacement between the brake caliper and the brake disk.

OBJECT OF THE INVENTION

The object of the invention is to connect a wheel bearing flange to a flat brake disk so that the brake disk in all operating conditions of the vehicle may align itself elastically between the brake pads, thus avoiding unwanted constraining forces.

DESCRIPTION OF THE INVENTION

The primary feature of the invention is an elastic connecting element arranged between the radial interior of the flat brake disk and the axial extension of the periphery of the wheel bearing flange, around which the interior of the disk is displaced. The elastic connecting element can compensate for the displacements (radial, axial and/or in a circumferential direction) between the flat brake disk and the brake caliper. These displacements substantially occur upon temperature differences between the brake disk and the wheel bearing flange and under cornering due to the loads being effected from the wheel which loads cause elastic deformation of the wheel bearing flange. The elastic connecting element compensates for these movements. The movements to be equalized between the axial extension of the flange and the receptacle for the brake disk are generally under 1 mm.

The connecting element has a further advantage in that it separates the different materials of the brake disk and the wheel flange. As a result, no corrosion processes take place between the two.

The elastic connecting element additionally compensates for the production tolerances of the adjacent components.

A further advantage of the connecting element is that it can be manufactured as a single part. As a result, only one part need be handled and installed.

The brake disk is advantageously pre-loaded in the circumferential direction. As a result, no bumps occur when a braking torque is introduced between the brake disk and the projecting parts on the axial extension at the periphery of the flange where the brake disk is disposed. In the area of the circumferential direction flanks of the projections radially outward from the flange, the elastic connecting element pre-loads the projections against correspondingly shaped recesses in the interior of the brake disk.

The elasticity is achieved through radial flutes formed in the connecting element. The material of the connecting element is optimally exploited by these flutes, and the elasticity of that element is established in a simple manner by production technology.

A radially outwardly directed edge is incorporated on the connecting element. This edge is positioned against the lateral side of the brake disk, so that the edge has a damping effect on the disk in an axial direction. The edge is positioned on the side facing away from the direction of installation i.e., the side of the axial extension toward which the brake disk is moved as it is installed in the axial direction onto the axial extension. The brake disk is axially pre-loaded together with the axial retaining element. As a result, displacements between the axial extension of the wheel bearing flange and the brake disk can be compensated for.

DETAILED DESCRIPTION OF THE DRAWINGS

Figure 1:
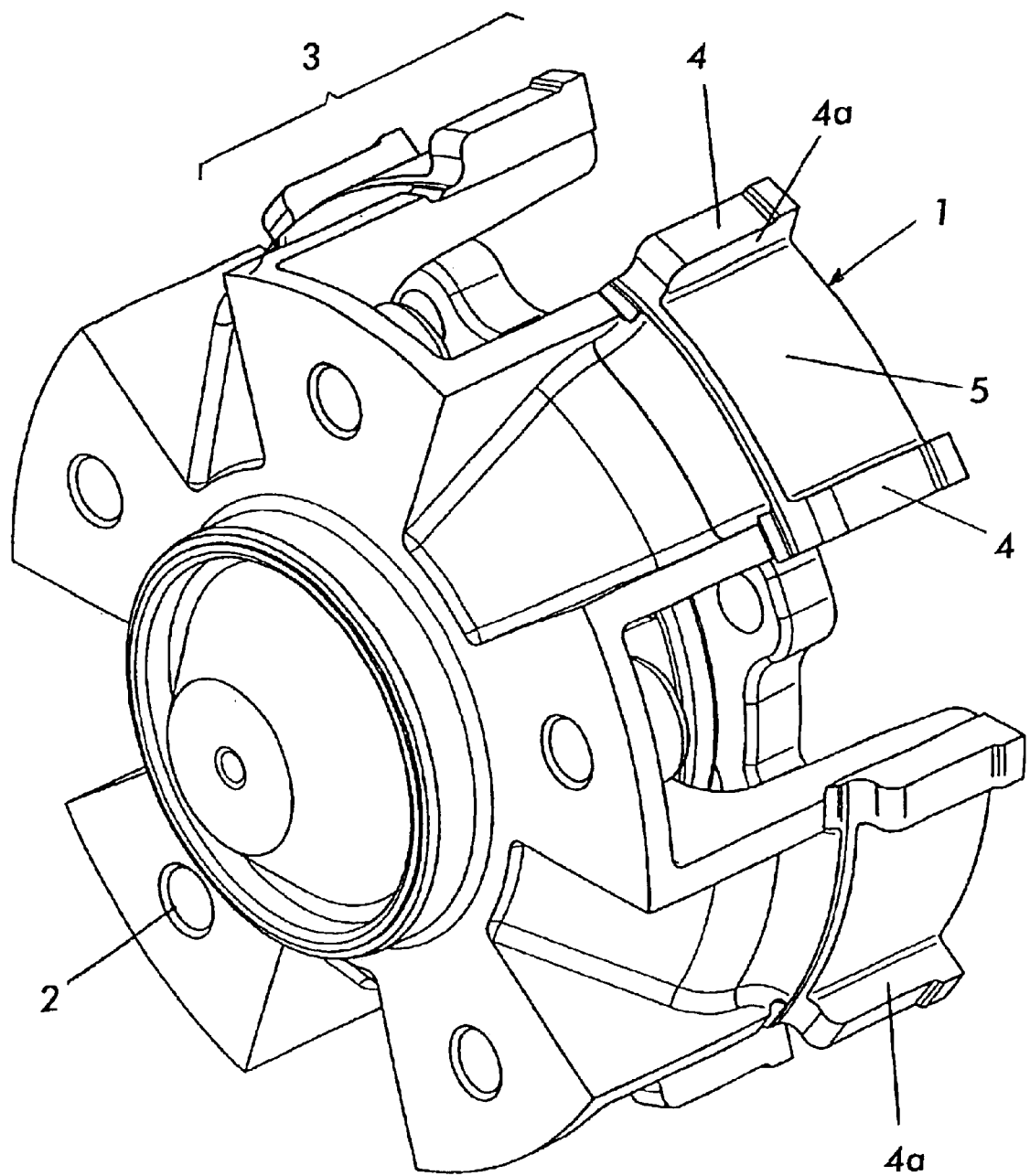
FIG. 1 shows a wheel bearing flange with an axial extension.
Figure 5:
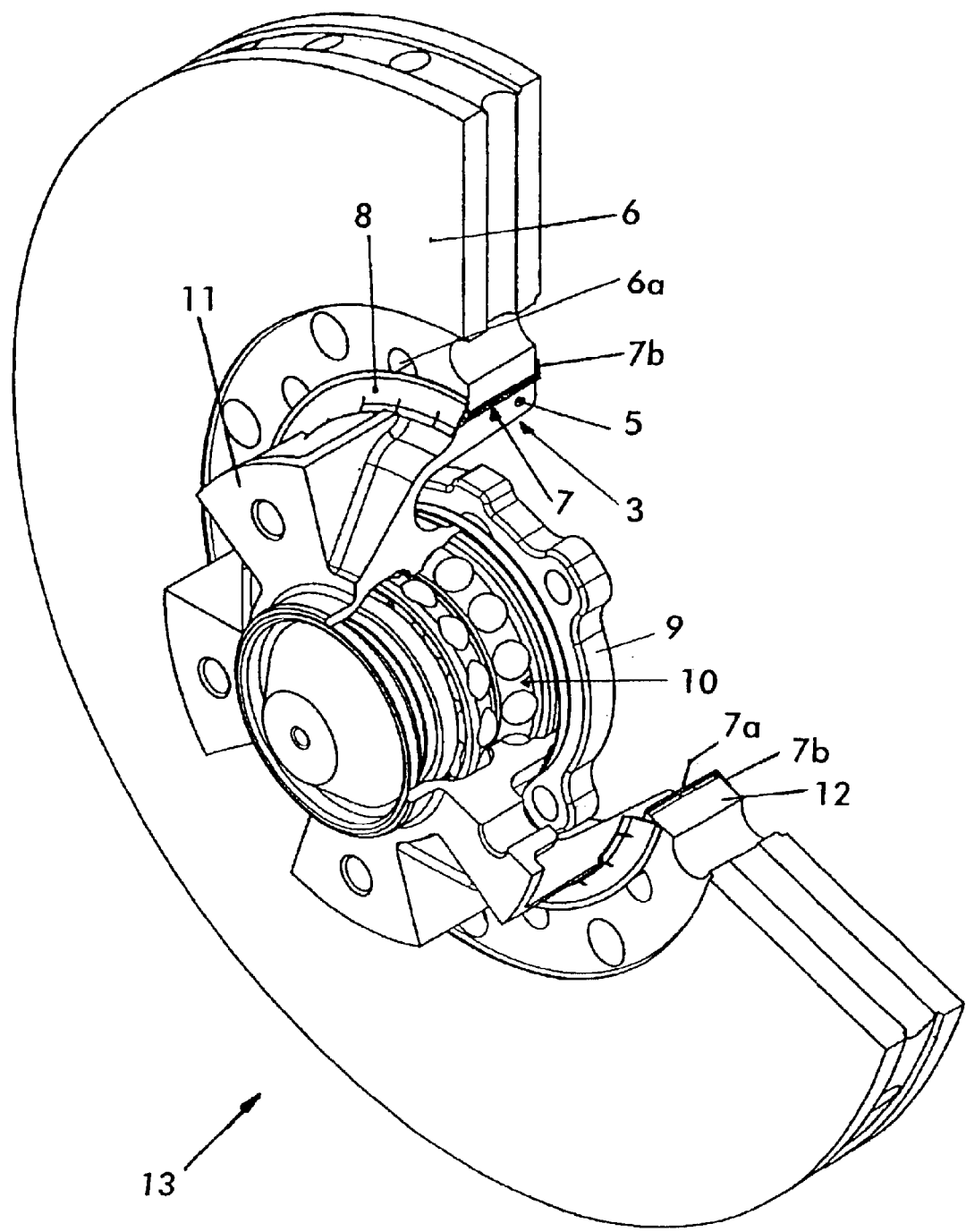
FIG. 5 shows a section of FIG. 4.

FIG. 1 shows the wheel bearing flange 1 in perspective. A rolling bearing lies within the wheel bearing flange 1 as seen in FIG. 5. There are fastening bores 2 of the rim. An axial extension 3 at the periphery of the wheel flange 1 extends axially to be radially underneath the flat brake disk 6 shown in FIG. 3a.

Radially outwardly directed projections 4 are for mounting the brake disk and are illustrated in the area of the axial extension 3. The flanks of the projections transfer the braking torque to the disk 6. The brake disk 6 (FIG. 3a) is radially centered on the surface 5 of the axial extension 3. The meander form between the receptacle of the brake disk 12 and the receptacle of the wheel rim 111 is shown in FIG. 15. Axial extension and rim receptacle therefore alternate with each other.

Figure 2:
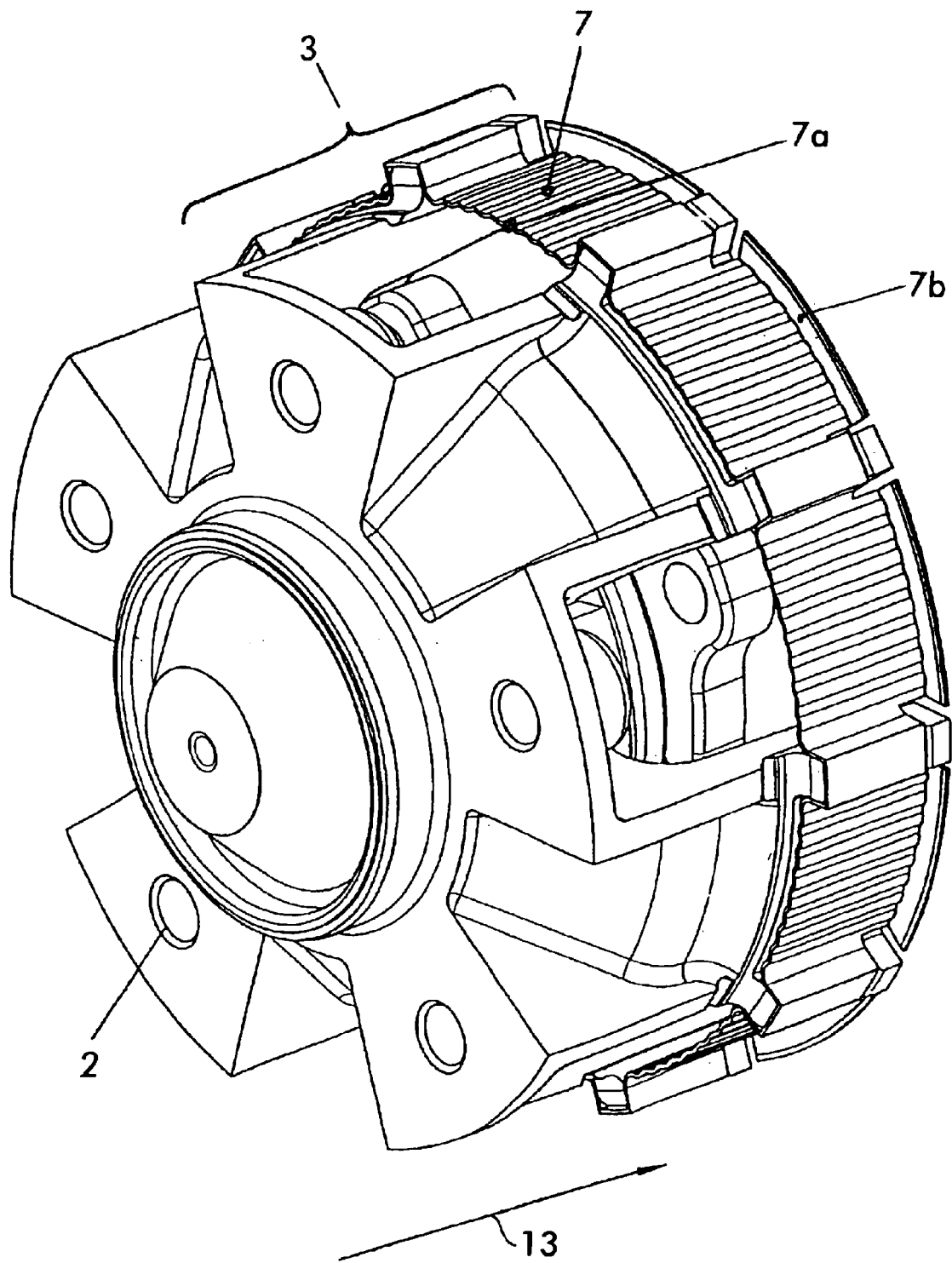
FIG. 2 shows the wheel bearing flange of FIG. 1 with the connecting element arranged in place.

FIG. 2 shows the flange of FIG. 1 with an elastic connecting element 7 installed. This comprises a corrugated metal connecting element 7a. The corrugated form is preferred to achieve the necessary elasticity in the connecting element. Other forms having surface bumps or stamped undulations may be used. Because of the arrangement of the connecting element 7a, for which non-rusting metal sheet is a preferred material, the materials of the brake disk and the opposing axial extension 3 are completely isolated, which prevents formation of rust between the different materials. In the area of the circumferential side flanks 4a of the projections 4, the connecting element 7 is formed in an angle such that the brake disk is pre-loaded in the circumferential direction. In the area of the flanks 4a, e.g. surface bumps can also be incorporated in order to achieve this pre-load in the connecting element. Surface bumps are not shown.

A radially outwardly directed edge 7b of the connecting element 7 is positioned lightly against the brake disk when it is installed on the flange, achieving the effect of a diaphragm spring when the brake disk is fully installed and fastened. In FIG. 5, an installation direction 13 from the rim is suggested for the brake disk. The radially-directed edge 7b is therefore incorporated on the opposing side of the connecting element toward which the brake disk is moved as it is installed on the flange. A possible reversal of the installation direction is not illustrated.

Figure 3A:
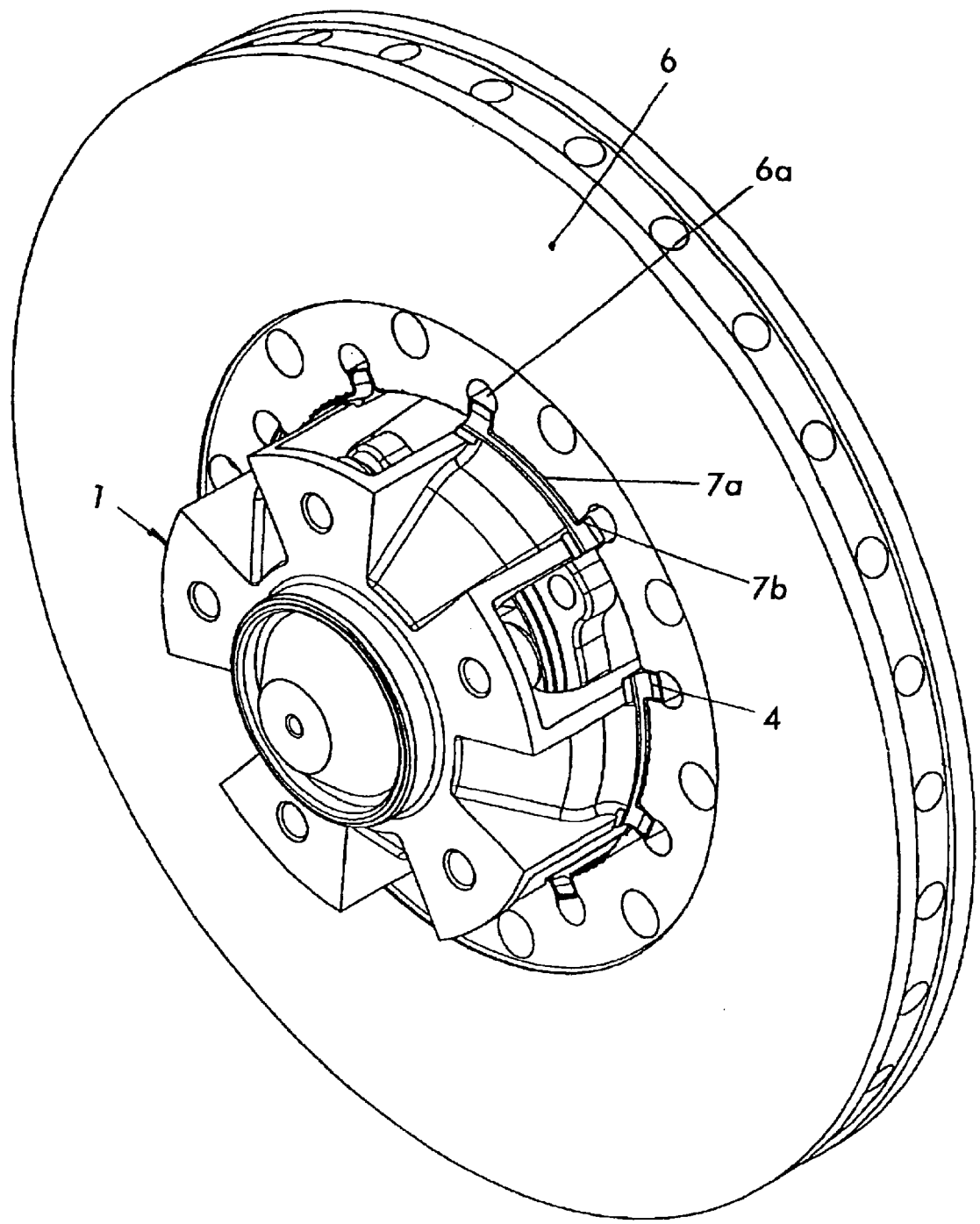
FIGS. 3a, 3b show the flange of FIG. 2 with a flat brake disk installed from the outward and inward sides, respectively.
Figure 3B:
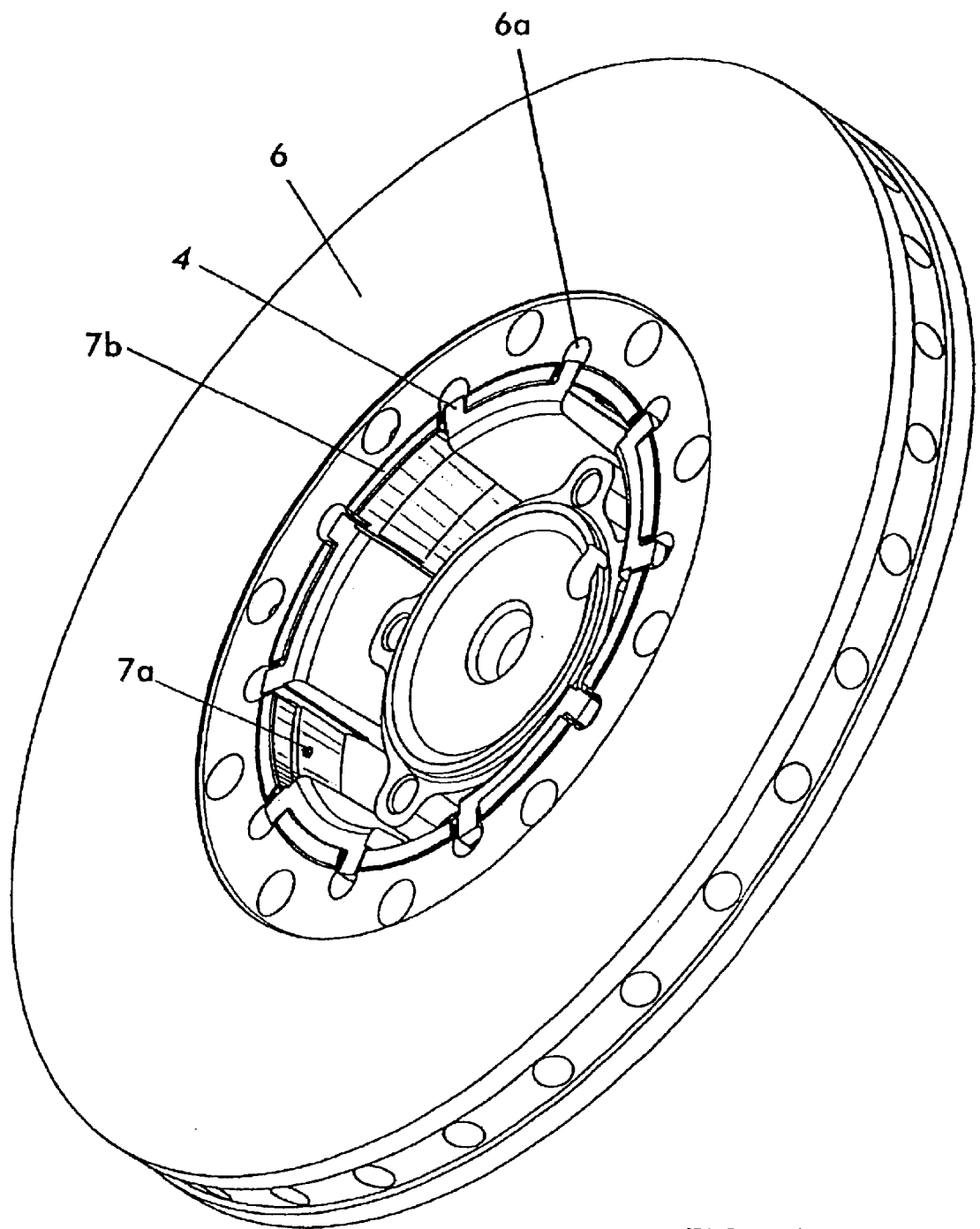

FIG. 3a and FIG. 3b show the wheel bearing flange and connecting element and the installed flat brake disk 6. In this case, the brake disk 6 has been installed from the direction of the rim receptacle 2. After installation, the brake disk is pre-loaded both in a radial direction and in a circumferential direction with regard to the axial extension 3. The recesses 6a in the inward side of the brake disk transfer the braking torque via the elastic connecting element 7 onto the flanks 4a of the projections 4 in the axial extension 3 of the wheel bearing flange 1.

Figure 4:
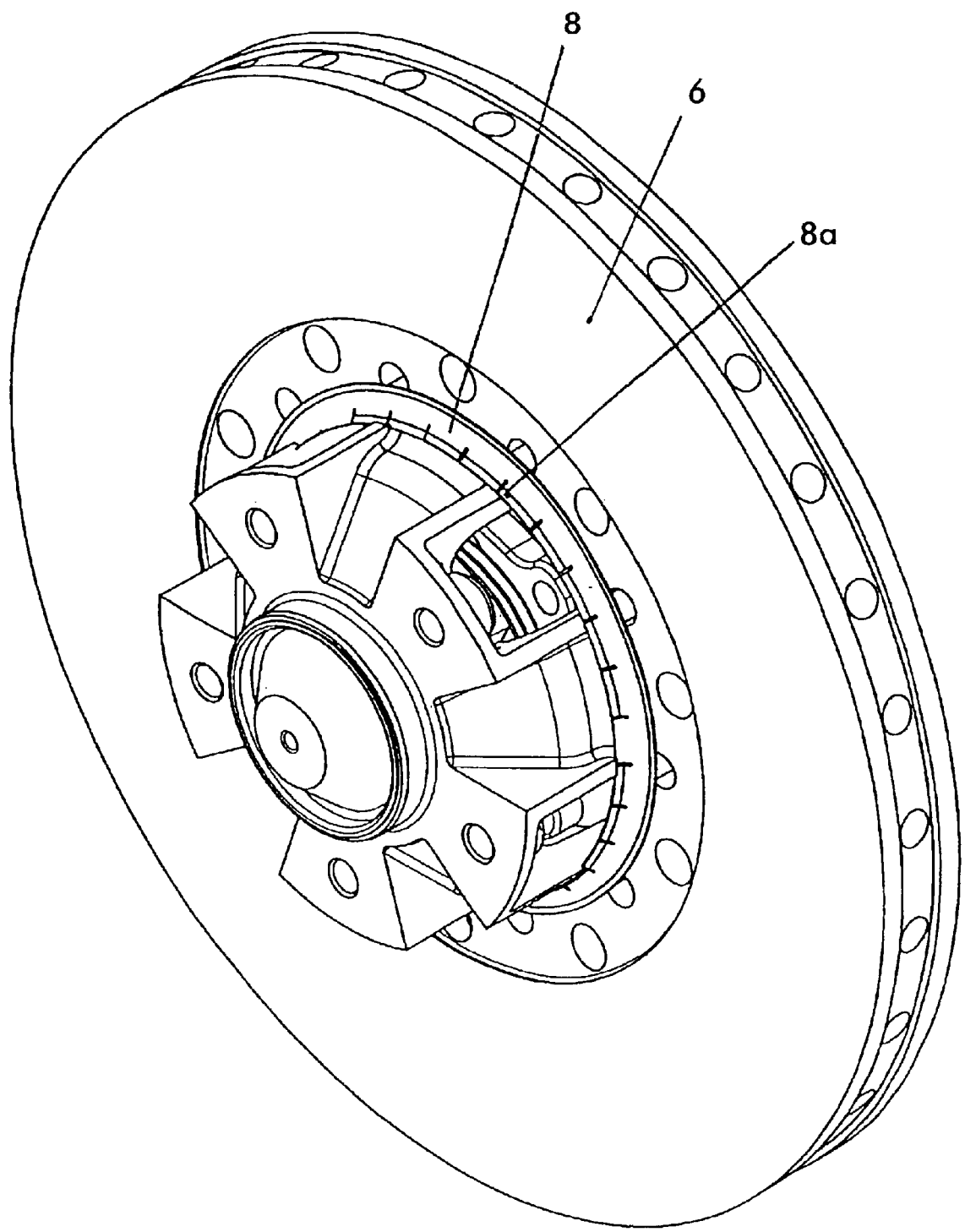
FIG. 4 shows the flange of FIG. 3 with an axial retaining element.

FIG. 4 shows the range of FIGS. 3a/3b after installation of an axial retaining element 8. The retaining element 8 presses the brake disk 6 against the radial edge 7b of the connecting element 7 and thus pre-loads the brake disk. The brake disk 8 is therefore attached in a manner which allows displacement of the brake disk 8 in an axial direction in relation to the axial extension 3 of the wheel bearing flange 1. In this example, the axial retaining element 8 is secured by springs 8a, wherein the springs engage in recesses in the axial extension 3 of the wheel bearing flange.

FIG. 5 is a sectional and perspective illustration of the complete unit. The stationary wheel bearing flange 9 or fastening flange and the rolling bearing 10 are seen. The rotating wheel bearing flange 1 and the axial extension 3 are shown in section. The elastic connecting element 7 is between the axial extension 3 and the flat brake disk. The radially outwardly directed damping edge 7b axially pre-loads the brake disk and the retaining element 8. The installation direction of the flat brake disk 6 of the connecting element 7 and the metal retaining plate 8 is from the direction of the rim receptacle in this arrangement. The meander design of the wheel bearing flange 1 and the axial extension 3 comprised of first level rim receptacle 11, second level 12 centering surface areas 5 for the brake disk 6, which are offset with respect to the first level, is a pre-condition for this installation direction 13.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A wheel bearing flange for mounting of a brake disk, the flange comprising:

a flange body having a periphery, axial extensions at the periphery of the body for mounting of a brake disk thereon; the axial extensions having a plurality of radially outwardly directed projections;

the brake disk comprising an annular brake disk having an interior around the body, around the axial extensions and over the connecting element;

an isolating and connecting element disposed around the body and positioned between the axial extensions and the brake disk therearound, the connecting element between the axial extensions and the brake disk elastically pre-loads the brake disk in relation to the axial extensions;

the brake disk having radially inwardly opening recesses at the interior thereof which are located and shaped to receive the projections of the axial extensions in a rotation driving manner.

2. The wheel bearing flange of claim 1, wherein the brake disk is a flat disk.

3. The wheel bearing flange of claim 1, wherein the radially outwardly directed projections have side flanks at the circumferential sides thereof and which engage the brake disk in the recesses thereof such that the connecting element pre-loads the brake disk in the circumferential direction at the side flanks of the projections.

4. The wheel bearing of claim 1, wherein the connecting element is comprised of metal.

5. The wheel bearing of claim 4, wherein the connecting element includes integrally formed radial flutes for providing the connecting element with the elasticity.

6. The wheel bearing flange of claim 1, wherein the connecting element includes integrally formed radial flutes for providing the connecting element with the elasticity.

7. The wheel bearing flange of claim 1, wherein the flange is shaped to provide an axial direction installation direction for the brake disk onto the axial extensions of the flange;

the connecting element including a radially outwardly directed edge on a side of the axial extensions toward which the brake disk is moved as it is moved onto the axial extensions in the installation direction, wherein the edge is shaped and positioned as to have a damping effect on the brake disk in the axial direction.

8. The wheel bearing flange of claim 7, further comprising a retaining element at the axial extensions on the opposite side of the brake disk from the radially outwardly directed edge, and the retaining element and the edge being shaped and positioned and of material as to elastically pre-load the brake disk in an axial direction.

9. The wheel bearing flange of claim 1, further comprising a fastening flange and a rolling bearing connection between the fastening flange and the wheel bearing flange so that the wheel bearing flange is rotatable with respect to the fastening flange.

* * * * *